(12) United States Patent
Wang et al.

(10) Patent No.: US 10,914,851 B2
(45) Date of Patent: Feb. 9, 2021

(54) TIME OF FLIGHT CALIBRATION IN DIGITAL POSITRON EMISSION TOMOGRAPHY

(71) Applicant: KONINKLIJKE PHILIPS N.V., Eindhoven (NL)

(72) Inventors: Sharon Xiaorong Wang, Highland Heights, OH (US); Thomas Leroy Laurence, North Royalton, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/911,884

(22) Filed: Jun. 25, 2020

(65) Prior Publication Data

US 2020/0363543 A1   Nov. 19, 2020

Related U.S. Application Data

(63) Continuation of application No. 15/510,717, filed as application No. PCT/IB2015/057160 on Sep. 17, 2015, now Pat. No. 10,698,125.

(60) Provisional application No. 62/053,863, filed on Sep. 23, 2014.

(51) Int. Cl.
  *G01T 7/00* (2006.01)
  *G01T 1/29* (2006.01)
(52) U.S. Cl.
  CPC ............ *G01T 7/005* (2013.01); *G01T 1/2985* (2013.01)

(58) Field of Classification Search
  CPC .............................. G01T 7/005; G01T 1/2985
  See application file for complete search history.

(56) References Cited

U.S. PATENT DOCUMENTS

| | | | |
|---|---|---|---|
| 6,327,546 | B1 | 12/2001 | Petrillo |
| 7,129,495 | B2 | 10/2006 | Williams |
| 7,557,350 | B2 | 7/2009 | Muehllehner |

(Continued)

OTHER PUBLICATIONS

Reynolds, et al., "Convex optimization of coincidence time resolution for high resolution PET systems", Nuclear Science Symposium Conference Record 2008.

(Continued)

*Primary Examiner* — Christine S. Kim (57) ABSTRACT

Time of flight (TOF) corrections for radiation detector elements of a TOF positron emission tomography (TOF PET) scanner are generated by solving an over-determined set of equations defined by calibration data acquired by the TOF PET scanner from a point source located at an isocenter of the TOF PET scanner, suitably represented as matrix equation at $\overline{\Delta t}=CS$ where $\overline{\Delta t}$ represents TOF time differences, C is a relational matrix encoding the radiation detector elements, and S represents the TOF corrections. A pseudo-inverse $C^{-1}$ of relational matrix C may be computed to solve $S=C^{-1}\overline{\Delta t}$. TOF corrections can be generated for a particular type of detector unit by identifying the radiation detector elements in C by detector unit. Further, multi-photon triggering time stamps can be adjusted to first-photon triggering based on $\sqrt{P1/Pm}$ where P1 is average photon count using first-photon triggering and Pm is a photon count using multi-photon triggering.

5 Claims, 4 Drawing Sheets

(56) References Cited

U.S. PATENT DOCUMENTS

| | | | |
|---|---|---|---|
| 7,778,787 B2 | 8/2010 | Fiedler | |
| 8,395,127 B1* | 3/2013 | Frach | G01T 1/2985 |
| | | | 250/370.11 |
| 2004/0084625 A1 | 5/2004 | Williams | |
| 2007/0152162 A1 | 7/2007 | Griesmer | |
| 2008/0130838 A1 | 6/2008 | Muehllehner | |
| 2008/0265167 A1 | 10/2008 | Laurence | |
| 2016/0011321 A1* | 1/2016 | Solf | G01T 1/171 |
| | | | 250/363.03 |

OTHER PUBLICATIONS

Hongdi, et al., "An Accurate Timing Alignment Method with Time-to-Digital Converter Linearity Calibration for High-Resolution TOF PET", IEEE Transactions on Nuclear Science, vol. 62, No. 3, Jun. 1, 2015.

Degenhardt, et al., "The digital Silicon Photmultiplier—A novel sensor for the detection of scintillation light", 2009 IEEE Nuclear Science Symposium and Medical Imaging Conference, 2009.

\* cited by examiner

TIME OF FLIGHT CALIBRATION IN DIGITAL POSITRON EMISSION TOMOGRAPHY

This application is a continuation of U.S. application Ser. No. 15/510,717, filed Mar. 13, 2017 which is a U.S. National Phase Application under 35 U.S.C. § 371 of International Application No. PCT/IB2015/057160, filed Sep. 17, 2015, which claims the benefit of U.S. Provisional Patent Application No. 62/053,863, filed on Sep. 23, 2014. These applications are hereby incorporated by reference herein.

The following relates generally to positron emission tomography (PET) arts, including time-of-flight (TOF) PET, and to medical imaging using PET, a gamma camera, or another radioemission-based imaging technique, and the like; and to radiation detector time-stamping circuitry arts, radiation detection event time-stamping arts, and related arts.

In positron emission tomography (PET) medical imaging, a radiopharmaceutical is administered to a subject to be imaged. The radiopharmaceutical includes positron-emitting radioisotopes, and the positrons combine with electrons in positron-electron annihilation events each of which emits two oppositely directed 511 keV gamma rays (also called gamma particles, these terms being used interchangeably herein). The PET scanner includes radiation detectors disposed around the subject, usually forming an encircling ring of radiation detectors. Energy and time windowing are applied to the detected radiation events to identify coincident (or nearly coincident, i.e. within TOF of the gamma rays from the location of the positron-electron annihilation event to the respective detectors) 511 keV radiation detection events.

In conventional PET, each such 511 keV gamma ray pair defines a "line of response" between the detection events at the respective detectors, and the positron-electron annihilation event is known to be localized along that line. This localization is sufficient to reconstruct an image of the radiopharmaceutical distribution in the subject using a suitable reconstruction technique such as filtered backprojection, iterative forward-backward projection, various Fourier transform image reconstruction techniques, or so forth.

In time-of-flight (TOF) PET, a further resolution improvement is obtained by determining a localization of the positron-electron annihilation event along the line-of-response based on the difference (if any) between the constituent 511 keV detection events. For example, if both 511 keV detection events occurred at precisely the same time, then the positron-electron annihilation event was located equidistant between the two detectors. On the other hand, if detector "A" detected its 511 keV event at some time before detector "B", then the positron-electron annihilation event was located closer to detector "A" versus detector "B", and the quantitative time difference enables quantitative positioning of the event along the line of response.

TOF resolution, accuracy, and precision depend on the accuracy of the (difference in) time stamps assigned to the 511 keV detection events of a coincident pair. Due to the high speed of light (approximately $3 \times 10^{10}$ cm/s, or 0.03 cm/picosecond), time stamp accuracy on the order of a few tens of picoseconds or better is preferable in order to provide useful TOF localization along the line of response. This is difficult to achieve across an encircling array of detectors that is large enough to receive a medical subject. Temporal variations can occur at the detector element or crystal level (that is, at the scintillator level in the case of radiation detectors comprising scintillator crystals with coupled optical detectors) due to differences in detector response times, or at a higher level (e.g., module level) due to differences in electrical signal propagation times or other factors.

In the case of radiation detectors that employ scintillators, another difficulty in obtaining precise time stamping resides in the cascade nature of the scintillation event. When a gamma ray is absorbed by the scintillator crystal, a burst of light (scintillation) is generated that extends over time and has some finite photon emission-versus-time profile which is read by a photomultiplier tube (PMT), semiconductor-based photodetector, or other light detector as photon counts over the time of the scintillation burst. The trigger for time stamping must be defined with respect to this distribution. Various triggers can be used, such as triggering the time stamp on receipt the first photon ($1^{st}$ photon trigger), or triggering the time stamp on receipt within a time window of two (or more) photons (multi-photon trigger). Since TOF accuracy depends on relative time stamps of 511 keV detection pairs, in principle any trigger could be used so long as it is uniformly applied across the detectors. In practice, $1^{st}$ photon triggering provides the best temporal resolution, but at the cost of higher noise since detector dark current can be more easily mistaken for a scintillation trigger. Multi-photon triggering is less noisy but also provides poorer resolution.

The present application provides anew and improved system and method which overcome these problems and others.

In accordance with one aspect, a time-of-flight positron emission tomography (TOF PET) imaging system is disclosed, including a TOF PET scanner comprising radiation detector elements and an electronic data processing device programmed to: operate the TOF PET scanner to acquire calibration data comprising annihilation event data acquired for positron-electron annihilation events occurring in a point source located at an isocenter of the TOF PET scanner wherein each annihilation event datum includes an identification of the radiation detector elements detecting two oppositely directed 511 keV gamma rays emitted by the annihilation event and a time difference between detection of the two oppositely directed 511 keV gamma rays emitted by the annihilation event; generate TOF corrections for the radiation detector elements by solving an over-determined set of equations defined by the calibration data; operate the TOF PET scanner to acquire list mode imaging data comprising 511 keV gamma ray detection events acquired from an imaging subject; generate corrected list mode imaging data by applying the TOF corrections to the list mode imaging data; and reconstruct the corrected list mode imaging data to generate a reconstructed image of at least a portion of the imaging subject. The TOF corrections may be generated by solving the matrix equation $\overline{\Delta t}=CS$ for S, where $\overline{\Delta t}$ stores the time differences of the calibration data, C is a relational matrix encoding the identifications of the radiation detector elements, and S stores the TOF corrections. This matrix equation may, for example, be solved by computing a pseudo-inverse $C^{-1}$ of the relational matrix C and computing $S=C^{-1}\overline{\Delta t}$.

In accordance with another aspect, in a TOF PET imaging system as set forth in the immediately preceding paragraph and in which the TOF PET scanner is operated to acquire list mode imaging data using multi-photon triggering, the electronic data processing device may be further programmed to adjust time-stamps of the list mode imaging data to values that would have been obtained using first-photon triggering. In one approach, time-stamps $TS_m$ of the list mode imaging data acquired using multi-photon triggering are adjusted to estimated first-photon triggered time stamps $$TS_1 = TS_m - a\sqrt{\frac{b}{Pm}}$$

where a and b are constants and Pm is the photon count for a list mode imaging datum acquired using multi-photon triggering.

In accordance with another aspect, a non-transitory storage medium stores instructions readable and executable by an electronic data processing device to perform a method operating on radiation detection event data acquired using a radiation detector element comprising a scintillator and a light detector coupled with the scintillator. The method suitably comprises: determining an average photon count P1 for the radiation detector element operating with first photon triggering based on calibration data acquired by the radiation detector element using first-photon triggering; determining a photon count Pm for an imaging radiation detection event detected by the radiation detector element during imaging of a subject using multi-photon triggering; and estimating a first-photon triggered time-stamp for the imaging radiation detection event based on the value $\sqrt{P1/Pm}$. In some embodiments the average photon count P1 for the radiation detector element operating with first photon triggering is determined by fitting a Gaussian distribution to a photon count per event histogram acquired by the radiation detector element using first-photon triggering.

In accordance with another aspect, a method comprises generating TOF corrections for radiation detector elements of a TOF PET scanner by solving an over-determined set of equations defined by calibration data acquired by the TOF PET scanner from a point source located at an isocenter of the TOF PET scanner, and correcting time stamps of imaging data acquired by the TOF PET scanner from an imaging subject using the generated TOF corrections. These operations are suitably performed by an electronic data processing device. In one approach, the TOF corrections are generated from calibration data comprising 511 keV gamma ray detection events each associated with a radiation detector element of the TOF PET scanner by operations including: performing time windowing on the 511 keV gamma ray detection events to identify 511 keV gamma ray detection event pairs corresponding to positron-electron annihilation events; and solving the over-determined set of equations $\Delta t_d = s_i + s_j$ where d indexes the $d^{th}$ 511 keV gamma ray detection event pair, i and j index the two radiation detector elements that detected the $d^{th}$ 511 keV gamma ray detection event pair, $\Delta t_d$ denotes the time difference between the gamma ray detections of the 511 keV gamma ray detection event pair, $s_i$ denotes the TOF correction for the $i^{th}$ radiation detector element, and $s_j$ denotes the TOF correction for the $j^{th}$ radiation detector element. The TOF corrections can be generated for a particular type of detector unit by grouping the calibration data by detector unit based on detector unit definitions that assign radiation detector elements of the TOF PET scanner to detector units, and solving the over-determined set of equations defined by the calibration data with the radiation detector elements identified in the calibration data by detector unit based on the grouping. The detector unit definitions may assign radiation detector elements of the TOF PET scanner to detector modules, detector tiles within detector modules, or scintillator crystals within detector tiles, and the grouping and solving may be repeated for detector modules, detector tiles, and scintillator crystals in succession with each successive repetition acting on the calibration data corrected by the TOF corrections generated by the previous repetition. The method optionally further includes adjusting a time stamp of a 511 keV gamma ray detection event of the imaging data acquired by a radiation detector element using multi-photon triggering to an adjusted time stamp corresponding to first-photon triggering based on the value $\sqrt{P1/Pm}$ where P1 is an average 511 keV gamma ray detection photon count for the radiation detector element using first-photon triggering and Pm is the photon count of the 511 keV gamma ray detection event of the imaging data.

One advantage resides in improved temporal resolution in time stamping circuitry of radiation detectors.

Another advantage resides in improved TOF PET image quality as a consequence of improved TOF resolution.

Another advantage resides in faster TOF calibration of a TOF PET system.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 1:
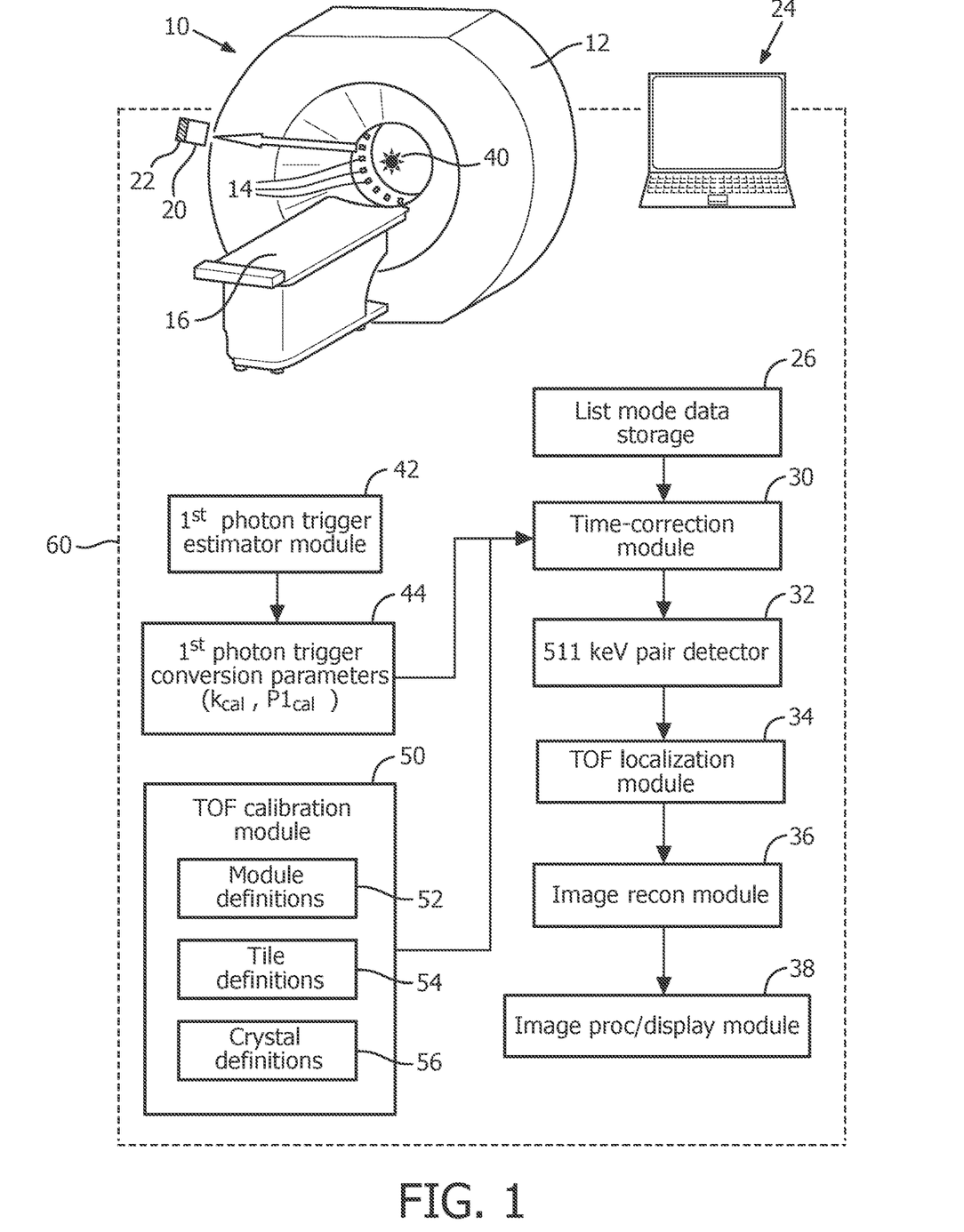
FIG. 1 diagrammatically shows a digital time of flight positron emission tomography (digital TOF PET) imaging system including TOF calibration and event time stamping aspects.

With reference to FIG. 1, a time of flight positron emission tomography (TOF PET) scanner 10 includes a scanner housing 12 supporting radiation detectors 14 arranged as a ring around an examination region. For imaging of human subjects, the examination region is suitably a horizontal bore sized to receive a prone human subject. A subject support 16 is arranged to enable a human subject to be loaded into the examination region in a horizontal position. The TOF PET scanner 10 may, by way of illustrative example, be a Vereos digital PET/CT scanner (available from Koninklijke Philips N.V., Eindhoven, The Netherlands) which also includes transmission computed tomography (CT) scanning capability not described herein. The radiation detectors 14 are configured to detect 511 keV radiation and may, by way of illustrative example (see inset at upper left of FIG. 1), employ scintillator crystals 20 coupled with optical detectors 22 such as digital silicon photomultiplier (SiPM) arrays, analog avalanche photodiode arrays, photomultiplier tube (PMT) detectors, or so forth. In illustrative FIG. 1 the radiation detectors 14 are diagrammatically indicated—in a typical commercial TOF-PET scanner the radiation detectors are covered by a bore liner or otherwise disposed inside the scanner housing and are not externally visible.

In operation, a subject is administered a radiopharmaceutical that includes a positron-emitting radioisotope. The radiopharmaceutical may be designed to aggregate in an organ or tissue of interest, such as the brain, lungs, a tumor, or so forth. The subject is loaded into the examination region via the subject support 16, and the radiation detectors 14 are operated to detect 511 keV gamma rays. To this end, a radiation particle is absorbed by the scintillator crystal 20 of a radiation detector 14 which generates a burst of light (scintillation) in the scintillator crystal 20. The scintillation comprises a burst of photons which are detected by one or more optical detectors 22 of the radiation detector. The radiation detector includes energy integration circuitry (for example, employing photon counting) to estimate the particle energy and time stamping circuitry that generates at time stamp for the radiation detection event. The estimated energy is preferably windowed to eliminate detection events not corresponding to 511 keV gamma rays. To this end, the radiation detectors 14 preferably include on-board digital processing capability to generate the time stamp and energy estimation as digital values. The resulting event data are offloaded to an electronic data processing device, e.g. computer 24 and are stored in data storage 26, preferably as list mode data storing the time stamp and energy of each event along with detector information.

The time stamp information of the list mode data generated by the TOF PET scanner 10 may have errors due to differences in response speed amongst the scintillator crystals and/or optical detectors, due to differences in electronic signal processing propagation speed amongst radiation detector modules, or so forth. To compensate for this, the electronic data processing device 24 is programmed to implement a time correction module 30 that applies a TOF calibration (to be described) to the radiation detector-generated time stamps. A 511 keV pair detector 32 examines the list mode data (preferably with the time correction performed by the module 30) to identify coincident 511 keV pairs. To this end, the 511 keV pair detector 32 suitably applies a time window to the list mode events data to detect event pairs that occurred within a small time window corresponding to the maximum possible difference in TOF travel time for oppositely directed 511 keV gamma rays emitted by a same positron-electron annihilation event. The 511 keV pair detector 32 may also utilize other information in filtering the list mode data to identify 511 keV pairs corresponding to positron-electron annihilation events—for example, since the two gamma rays emitted by a positron-electron annihilation event travel in opposite directions, two temporally coincident 511 keV detection events on the same detector module cannot have been generated by a positron-electron annihilation event in the examination region. A TOF localization module 34 processes the identified coincident 511 keV detection pairs to determine TOF localization information along the line of response connecting the two detection events, so as to generate TOF PET data that is reconstructed by an image reconstruction module 36 using a suitable reconstruction algorithm (such as filtered backprojection, iterative forward-backward projection, various Fourier transform image reconstruction techniques, or so forth) to generate a reconstructed image of the subject (or of a more limited field of view of the subject). The reconstructed image is utilized by an image processing/display module 38, for example to perform medically useful diagnostic, monitoring, or other analysis.

In the foregoing imaging data acquisition, pre-processing, and reconstruction, the time correction module 30 applies TOF calibration corrections that were generated prior to the subject imaging session. In approaches disclosed herein, the TOF calibration corrections are generated based on calibration data acquired by the TOF PET scanner 10 for a point source 40 that (during the calibration process) is loaded at an isocenter of the TOF PET scanner 10. The isocenter of the TOF PET scanner 10 is defined as follows: For any positron-electron annihilation event occurring at the isocenter, the two oppositely directed gamma rays generated by the annihilation event have equal (ground-truth) TOF travel times to their respective radiation detectors. Said another way, the two gamma rays of the gamma ray pair detected for any positron-electron annihilation event at the isocenter of the TOF PET scanner 10 should be detected at precisely the same time. The actual time stamps assigned by the radiation detectors 14 for the two gamma ray detection events may, however, be different, due to differences in detector response times, differences in signal propagation in the detector electronics, or so forth. During imaging data acquisition, the time correction module 30 applies TOF calibration corrections to compensate for these effects.

With continuing reference to FIG. 1, the point source 40 located at the isocenter of the TOF PET scanner 10 during calibration may, for example, be a Na-22 point source. More generally, the point source 40 is a small element whose compactness is sufficient that all positron-electron annihilation events occurring anywhere in the point source 40 can be considered to have occurred at the isocenter of the TOF PET scanner 10. For example, in some embodiments the disclosed TOF calibration techniques enable TOF resolution of below 300 picoseconds to be obtained. Light traveling at 0.03 cm/ps travels 9 cm in 300 picoseconds, so for this example the point source 40 should be less than 9 cm in size (e.g. diameter), and more preferably less than 5 cm in size, and still more preferably less than 1 cm in size.

In the illustrative system of FIG. 1, two timing adjustments are generated during the TOF calibration. One adjusts a time stamp generated using a multi-photon time stamp trigger to a time stamp that would have been generated using a single-photon time stamp trigger. This adjustment is performed by a $1^{st}$ photon trigger estimator module 42 which is described in further detail herein, and generates $1^{st}$ photon trigger conversion parameters 44 that are henceforth applied to acquired subject imaging data by the time correction module 30. This adjustment is optional, but if used advantageously enables time stamps for list mode imaging data to be generated in response to a multi-photon (e.g. two-photon) trigger so as to reduce the impact of noise, while at least partially recovering the better time resolution that would have been obtained by time stamping in response to $1^{st}$ photon triggering.

The second timing adjustment is a TOF correction that accounts for variations in detector response time and for variations in signal propagation amongst different detector units, and is performed by a TOF calibration module 50 which is described in further detail herein. The TOF calibration module 50 advantageously operates on data acquired from the point source 40 in a single acquisition session, and this acquired calibration data can be reprocessed using different detector unit groupings to generate TOF corrections for different detector units. In the illustrative example, the radiation detectors 14 are assumed to be constructed as a set of detector modules, and there is a TOF correction for each detector module that corrects for signal propagation delay or other factors associated with the module. To this end, module definitions 52 identify the radiation detector elements associated with each module. In one illustrative example, there are 18 modules, although more or fewer modules are contemplated. Within each detector module, the radiation detector elements are physically laid out on a set of tiles (e.g. circuit boards, or silicon wafers in the case of monolithic SiPM arrays, or so forth). In one illustrative example, each module includes 20 such tiles, so that the entire detector ring has 20×18=360 tiles, with the radiation detectors of each tile identified by tile definitions 54. In embodiments in which scintillator crystals are employed, another TOF correction may be associated with each scintillator crystal, as different scintillator crystals may have different response times. Crystal definitions 56 identify the groupings of radiation detectors by crystal. In general, each detector tile includes one or more scintillator crystals. These are merely illustrative examples, and other detector unit types may be usefully defined based on factors such as the physical layout and construction of the radiation detector ring.

The TOF PET imaging system of FIG. 1 is an illustrative example, and numerous variants are contemplated. For example, in one variant the radiation detectors 14 are analog devices, and analog signals (e.g. pulses corresponding to photon counts generated by the optical detectors 22) are offloaded to the computer 24 which then generates the energy estimate and the initial time stamp that is then modified by operation of the time correction module 30. More generally, the data processing operations may be variously allocated between on-board electronics of the TOF PET scanner 10 and off-board electronic data processing device(s) such as the computer 24, or cloud computing resources, or so forth, and this is diagrammatically represented in FIG. 1 by a generic electronic data processing device 60 representing the combined processing hardware of the TOF PET scanner 10 and off-board electronic data processing device(s) 24 some of which may be cloud-based.

It will be further appreciated that the TOF PET calibration and imaging data processing techniques disclosed herein may be embodied by a non-transitory storage medium storing instructions readable and executable by the electronic data processing device 60 to perform the disclosed techniques. Such a non-transitory storage medium may comprise a hard drive or other magnetic storage medium, an optical disk or other optical storage medium, a cloud-based storage medium such as a RAID disk array, flash memory or other non-volatile electronic storage medium, or so forth.

Figure 2:
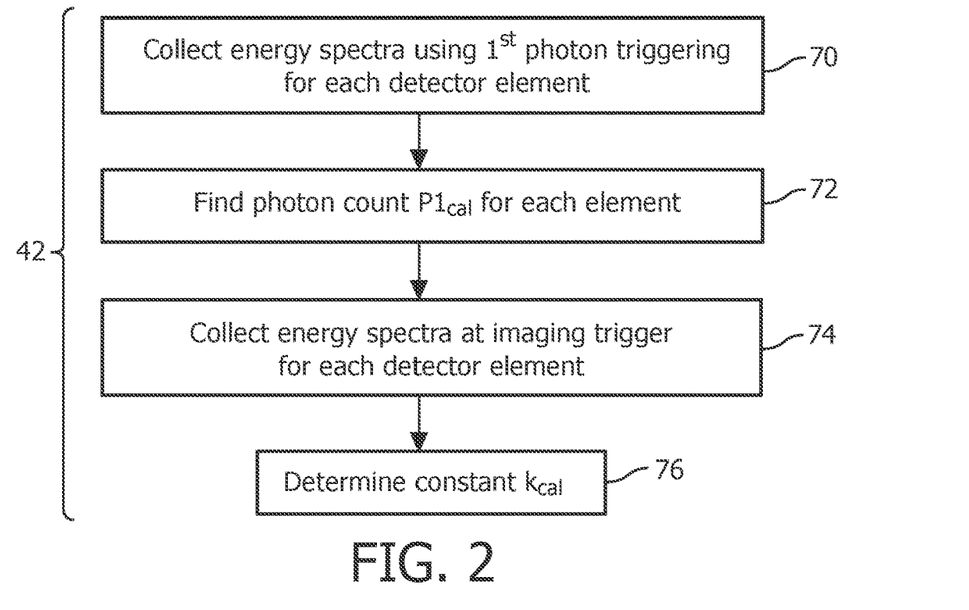
FIG. 2 diagrammatically shows operation of the $1^{st}$ photon trigger estimator module of the TOF PET system of FIG. 1.
Figure 3:
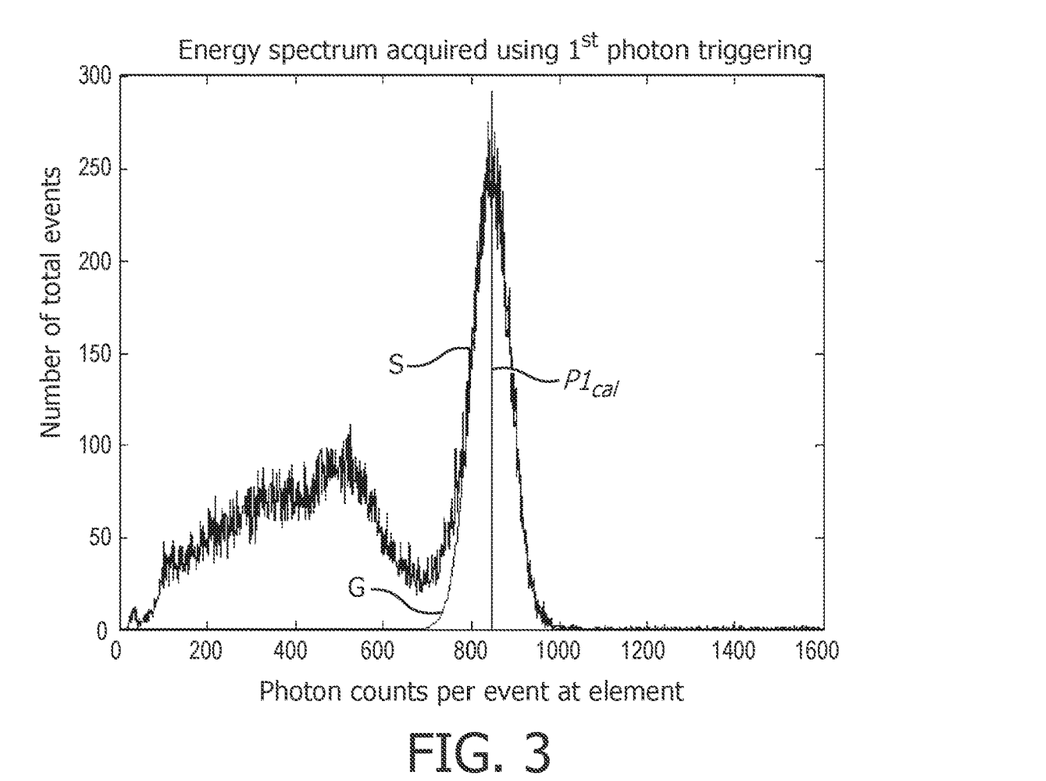
FIG. 3 plots an energy spectrum obtained using $1^{st}$ photon triggering, along with a Gaussian fitted to the peak.

With continuing reference to FIG. 1 and with further reference to FIGS. 2 and 3, an illustrative embodiment of the $1^{st}$ photon trigger estimator module 42 is described. This timing adjustment estimates the time stamp that would be obtained in response to a $1^{st}$ photon trigger based on the time stamp actually obtained using a multi-photon (e.g. two-photon) trigger. The resulting adjusted time stamp has improved resolution as expected for $1^{st}$ photon triggering, but without the concomitant increased noise associated with triggering on the first photon received from a scintillation burst. With reference to FIG. 2, in a first operation 70, energy spectra are acquired for each radiation detector element using $1^{st}$ photon triggering. FIG. 3 plots such an energy spectrum S, with the photon counts per event on the abscissa and the number of total events having that photon count on the ordinate. In an operation 72 indicated in FIG. 2, a photon count centroid, denoted herein as P1, is determined for each detector element. In the illustrative embodiment, operation 72 is performed using a Gaussian fit according to:

$$G = a_0 + a_1 e^{\frac{-(x-\mu)^2}{\sigma^2}} \quad (1)$$

where $a_1$ and $a_2$ are linear constants, x is the abscissa parameter, $\mu$ is the fitted centroid (or mean), and $\sigma^2$ is the fitted variance. The parameters $a_0$, $a_1$, $\mu$, and $\sigma^2$ are fitted, and the output of operation 72 is the fitted centroid $P1_{cal}=\mu$. In FIG. 3 the fitted Gaussian G is also plotted, with the fitted calibration centroid $P1_{cal}$ indicated by a vertical line. It will be recognized that the centroid $P1_{cal}$ denotes the most likely photon count for the radiation detector element when the event detection is triggered using $1^{st}$ photon triggering. More generally, it is contemplated to employ other distributions, and/or fitting expressions, for determining the photon count centroid (or mean).

With continuing reference to FIG. 2, in an operation 74 energy spectra are acquired for each radiation detector element using the multi-photon (e.g. two photon) triggering that will be used during imaging data acquisition. Equation (1) (or another suitable centroid or mean function) is applied to this spectrum as well, yielding a centroid $Pm=\mu$ for the multi-photon triggering. The TOF adjustment $\Delta t_{m \to 1}$ to estimate the time stamp $TS_1$ for $1^{st}$ photon triggering from the time stamp $TS_m$ actually measured using multi-photon triggering is then given (in the illustrative case employing Equation (1) as the centroid function) by:

$$\Delta t_{m \to 1} = k \sqrt{\frac{P1}{Pm}} \quad (2)$$

If another centroid function is employed, Equation (2) is suitably adjusted accordingly. A calibration value $k_{cal}$ for the constant k is determined empirically in an operation 76 by fitting the time stamps $TS_1$ and $TS_m$ for the calibration data acquired in operations 70, 74 respectively. The TOF adjustment $\Delta t_{m \to 1}$ for a list mode imaging datum is then applied to approximate first-photon triggering as follows:

$$TS_1 = TS_m - \Delta t_{m \to 1} = TS_m - k_{cal} \sqrt{\frac{P1_{cal}}{Pm}} \quad (3)$$

where the right-most expression is for the illustrative example employing Equations (1) and (2). To generalize, for a given list mode event acquired as part of the imaging data using the multi-photon triggering, the time stamp using $1^{st}$ photon triggering is estimated by: (i) obtaining the actual photon count Pm for the imaging data event acquired using the multi-photon triggering (this is, or corresponds to, the energy estimate part of the list mode datum); and (ii) apply Expression (3) (or an equivalent) using this Pm and using the calibration values $P1_{cal}$ and $k_{cal}$ generated in operation 72 and operation 76, respectively.

The TOF adjustment of Equation (3) is optional. If applied, it advantageously provides improved resolution comparable with $1^{st}$ photon triggering without concomitant increased noise. However, in other contemplated embodiments this TOF adjustment is omitted, and the measured time stamps $TS_m$ are used without this adjustment.

With returning reference to FIG. 1, a suitable process performed by the TOF calibration module 50 entails acquiring a coincidence data set from a point source at the isocenter, measuring the difference in 511 keV detection time stamps of opposing detectors to get the TOF difference, distributing this difference to these detectors' clocks, and iteratively repeating the process until convergence is reached. This approach is slow as the process must be iterated until each detector element is sampled sufficiently, which can take well over an hour with existing TOF PET scanner systems. The explicit distribution nature of the approach also calls for the use of a scatter cylinder and masks the strongest signal off. Using scattered events that do not come from the isocenter, and noisier data due to the masked peak, reduces the calibration accuracy. The iterative nature of the calibration also requires multiple data acquisitions. Additionally, if calibrations are to be performed at different hardware levels (e.g. crystal, tile, module) then the iterative process including iterative data acquisitions must be repeated for each level.

Figure 4:
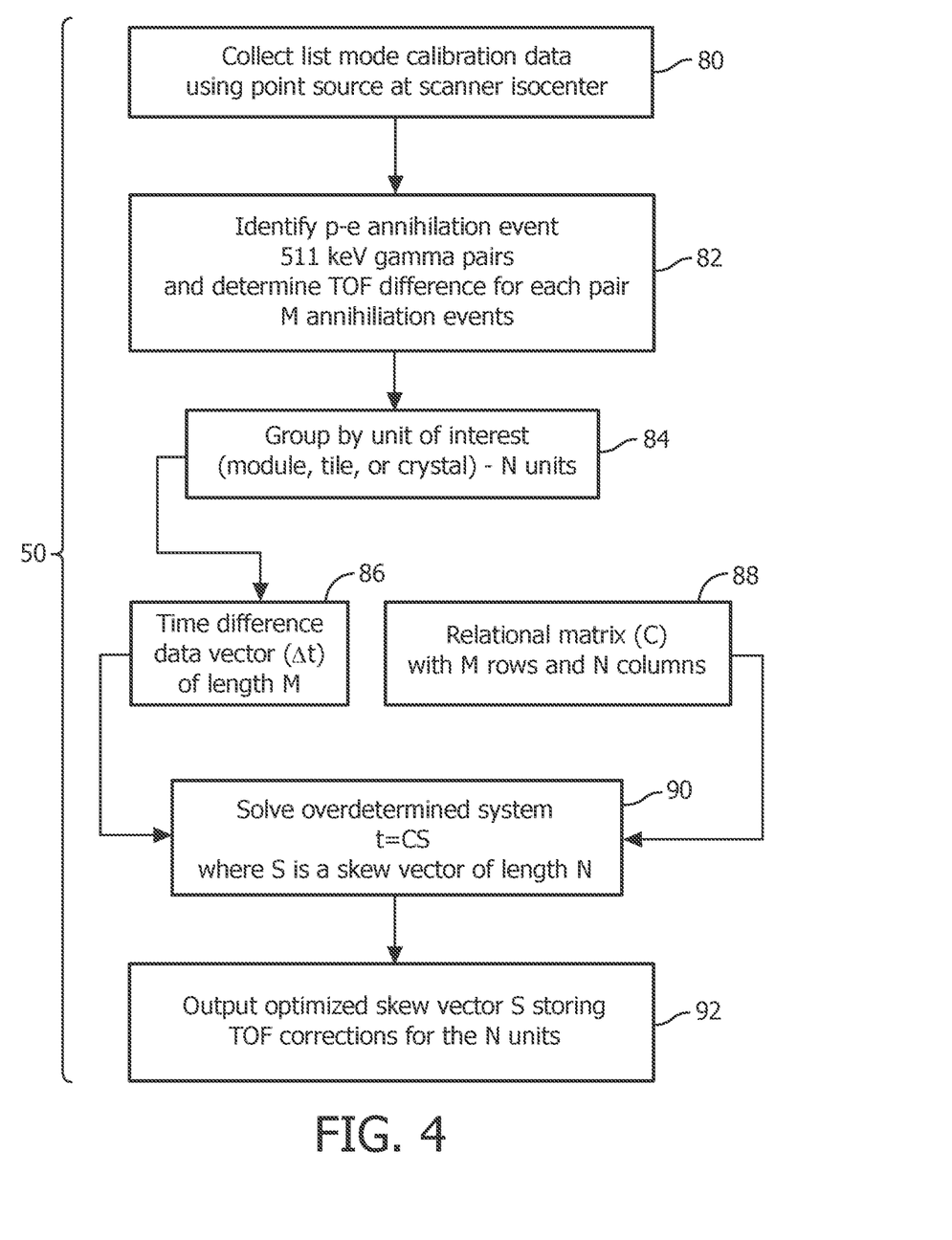
FIG. 4 diagrammatically shows operation of the TOF calibration module of the TOF PET system of FIG. 1.
Figure 5:
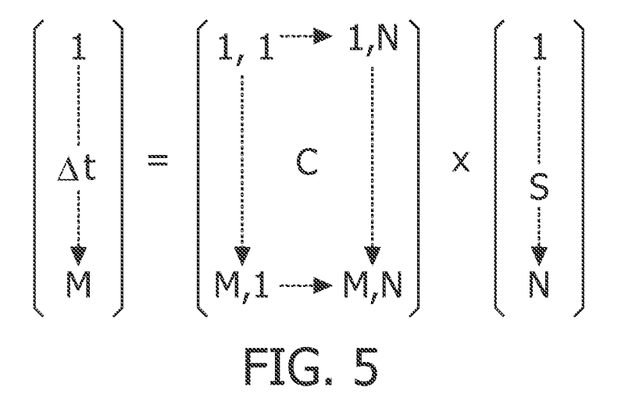
FIG. 5 diagrammatically shows a matrix formulation of the TOF calibration optimization performed by the TOF calibration module of FIG. 4.

With continuing reference to FIG. 1 and with further reference to FIGS. 4 and 5, disclosed herein is an improved TOF calibration approach suitably implemented by the TOF calibration module 50, which operates on a single data set from the point source 40 and can re-process the data set multiple times to generate a calibration for each detector unit (e.g., module, tile, crystal) of interest. With reference to FIG. 4, in an operation 80 list mode calibration data are collected using the TOF PET scanner 10 with the point source 40 located at the isocenter. In an operation 82, the list mode data generated in operation 80 are processed by the 511 keV pair detector 32 (see FIG. 1, processing here done without applying the time correction module 30) to generate a data set for positron-electron annihilation events each having a TOF difference $\Delta t$. Without loss of generality, these positron-electron annihilation events are indexed as d=1, ..., M where M is the number of positron-electron annihilation events in the data set. To illustrate, the $d^{th}$ positron-electron annihilation event is represented by three values: first and second detector element identifier values $e_{d,i}$ and $e_{d,j}$ identifying the respective detector elements that detected the two oppositely directed 511 keV gamma rays of the $d^{th}$ positron-electron annihilation event); and a TOF offset $\Delta t_d$ (which is in general a signed value to indicate which detector element $e_{d,i}$ or $e_{d,j}$ detected its event first). In an operation 84 the positron-electron annihilation events are grouped respective to detector unit of interest (e.g. by module based on the module definitions 52, or by tile based on the tile definitions 54, or by crystal based on the crystal definitions 56, see FIG. 1). In effect, this transforms the detector element identifier values $e_{d,i}$ and $e_{d,j}$ to detector unit identifiers $P_{d,i}$ and $P_{d,j}$ where (using modules as the unit of interest in this example) $P_{d,i}$ identifies the detector module to which detector element $e_{d,i}$ belongs, and $P_{d,j}$ identifies the detector module to which detector element $e_{d,j}$ belongs.

The resulting information can be represented by a vector of time differences 86 denoted herein as $\overline{\Delta t}$ of length M, and by a relational matrix 88 denoted herein as C that encodes the detector unit information $p_{d,i}$ and $p_{d,j}$. For example, in one suitable formalism the relational matrix C is a binary matrix of dimensions M×N whose $d^{th}$ row has all 0 values except for having 1 values in the $i^{th}$ and $j^{th}$ columns to encode the two detector units $p_{d,i}$ and $p_{d,j}$ involved in detecting the $d^{th}$ positron-electron annihilation event. In this notation, the M rows correspond to the M positron-electron decay events, and the N columns correspond to N units of interest (e.g. N modules, or N tiles, or N crystals, depending upon the unit of interest).

With this matrix formalism in place, in an operation 90 the TOF calibration is determined by solving the matrix equation:

$$\overline{\Delta t} = CS \qquad (4)$$

for the skew vector S, where S is of length N corresponding to the N units (modules, tiles, or crystals) undergoing TOF calibration. FIG. 5 diagrammatically represents Equation (4). For the $d^{th}$ positron-electron annihilation event, Equation (4) can be written as:

$$\Delta t_d = c_{d,i} s_i + c_{d,j} s_j \qquad (5)$$

where $c_{d,i}=1$ and $c_{d,j}=1$ (thus encoding the detectors information) and all other elements of the $d^{th}$ row of relational matrix C have zero values. Because M>N, and more typically M»N, it follows that the set of equations represented by matrix Equation (4) is over-determined, and can be solved in a least-squares optimization sense to determine the N elements of the skew vector S, which are then the TOF corrections for the N detector units. Leveraging the matrix formalism, the solution can be written as:

$$S = C^{-1} \overline{\Delta t} \qquad (6)$$

where $C^{-1}$ is the pseudo-inverse of the (non-square) relational matrix C As the relational matrix C has dimensions M×N, its pseudo-inverse $C^{-1}$ has dimensions N×M. Various approaches can be used to obtain the solution of Equation (6)—one suitable approach is to employ singular value decomposition (SVD), which is a standard function in matrix processing libraries such as those of Matlab® (available from MathWorks, Inc., Natick, Mass., USA). The output is the optimized skew vector 92 whose elements identify the TOF corrections for the N units of interest (e.g. modules, tiles, or crystals). While Expressions (4)-(6) employ a matrix formalism, more generally any approach for solving an over-determined set of equations can be employed.

With reference back to FIG. 1, the time correction module 30 applies the TOF correction values generated by the TOF calibration module 50 as follows. Consider a list mode datum having time stamp TS (either with or without the $\Delta t_{m \rightarrow 1}$ adjustment of Expression (3)) and acquired by a detector element e. The appropriate unit definitions (module definitions 52, tile definitions 54, or crystal definitions 56) is referenced to determine the corresponding detector unit (denoted here without loss of generality by detector unit index i), and the time stamp TS is corrected by $TS+s_i$ where the vector element $s_i$ is from the TOF correction for detector unit i obtained from the optimized skew vector S output from Expression (6).

It is to be understood that the mathematical formalism of the TOF calibration approach described herein with reference to FIGS. 4 and 5 and Expressions (4)-(6) can be modified in diverse ways without changing its underlying nature. For example, the various vectors and matrices can be variously transposed while still producing equivalent results. In general, the calibration performed by the TOF calibration module 50 entails: (1) collecting a data set of positron-electron annihilation events where each annihilation event datum includes an identification of the two detector elements that detected the annihilation event and the TOF difference $\Delta t$ between the 511 keV gamma ray detection events at the two detector elements; (2) allocating the detector elements to their respective detector units (e.g. modules, tiles, crystals); (3) encoding the detector units of the annihilation events using a relational matrix C; and (4) solving an over-determined system of equations of the form $\overline{\Delta t} = CS$ to obtain TOF corrections represented by S, where $\overline{\Delta t}$ stores the annihilation event time differences $\Delta t$. In some illustrative embodiments the operation (4) entails computing a pseudo-inverse $C^{-1}$ of the relational matrix C and employing a solution of the form $S = C^{-1} \overline{\Delta t}$. However, other approaches are contemplated, such as applying Levenberg-Marquardt least squares optimization to optimize parameters S of the over-determined system of equations represented by $\overline{\Delta t}=CS$.

Figure 6:
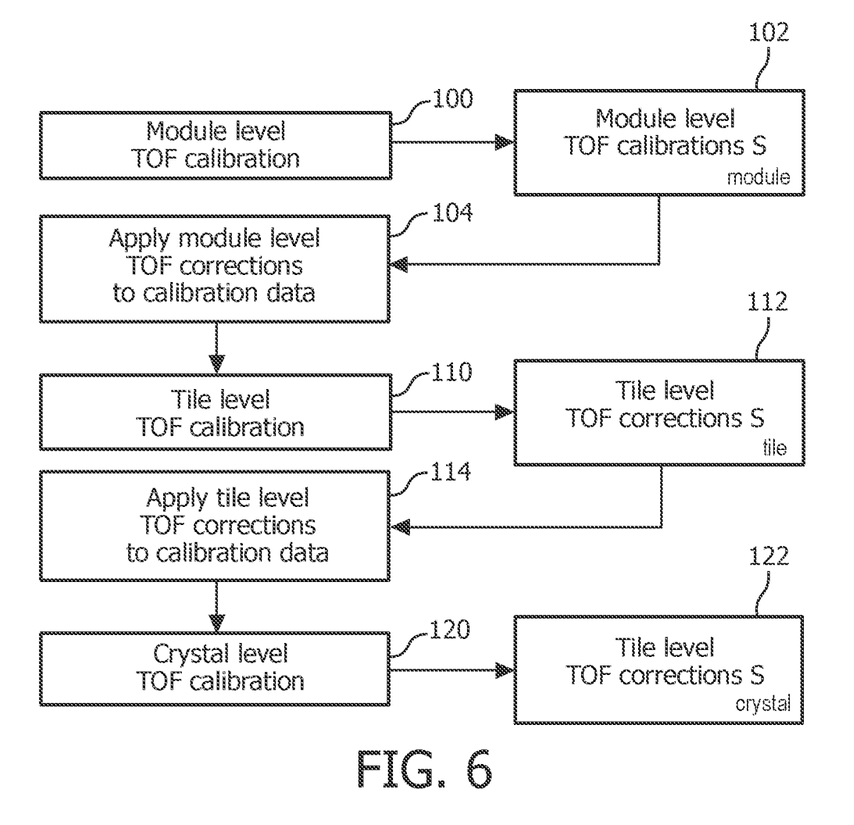
FIG. 6 diagrammatically shows a suitable process for generating TOF corrections at the module, tile, and crystal level.

With continuing reference to FIG. 5 and with further reference to FIG. 6, in embodiments in which TOF corrections are to be applied at multiple detector unit levels, e.g. module, tile, and crystal levels, a suitable approach is to apply the process of FIG. 5 in a "top-down" fashion for each detector unit level starting at the largest unit and working down to the smallest detector unit. This approach leverages the expectation that the TOF offsets introduced by larger detector units are likely to be larger than the TOF offsets introduced by smaller level units. FIG. 6 provides an illustrative example for the PET detector ring described herein in which the radiation detector elements 14 are arranged into modules, tiles (within the modules), and crystals (within the tiles). In an operation 100, the acquired positron-electron annihilation events data output by FIG. 4 operation 82 are processed at the module level in accord with FIG. 4 operations 84, 90 to generate module-level TOF corrections 102. In an operation 104, the module-level TOF corrections 102 are applied to the calibration data so that the data are corrected for TOF offsets introduced at the module level. Then, in an operation 110, the positron-electron annihilation events data with the module-level TOF corrections applied are processed at the tile level, again in accord with FIG. 4 operations 84, 90, to generate tile-level TOF corrections 112. In an operation 114, the tile-level TOF corrections 112 are additionally applied to the calibration data so that the data are corrected for TOF offsets introduced at both the module and tile levels. Finally, in an operation 120, the positron-electron annihilation events data with the module- and tile-level TOF corrections applied are processed at the crystal level, again in accord with FIG. 4 operations 84, 90, to generate crystal-level TOF corrections 122. During the subsequent processing of imaging data (not shown in FIG. 6), the module-, tile-, and crystal-level corrections 102, 112, 122 are applied to the list mode imaging data (or, alternatively, these corrections can be combined off-line to create a combined module+tile+crystal TOF correction for each detector element and the combined TOF correction then applied to correct the list mode imaging data). These corrections are applied by the time correction module 30 of FIG. 1, after which the 511 keV pair detector 32 is applied to identify 511 keV gamma ray pairs corresponding to positron-electron annihilation events, and TOF localization and image reconstruction is performed as described with reference to FIG. 1.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A non-transitory storage medium storing instructions readable and executable by an electronic data processing device to perform a method operating on radiation detection event data acquired using a radiation detector element comprising a scintillator and a light detector coupled with the scintillator, the method comprising:
    determining an average photon count P1 for the radiation detector element operating with first photon triggering based on calibration data acquired by the radiation detector element using first-photon triggering;
    determining a photon count Pm for an imaging radiation detection event detected by the radiation detector element during imaging of a subject using multi-photon triggering; and
    estimating a first-photon triggered time-stamp for the imaging radiation detection event based on the values of P1 and Pm.

2. The non-transitory storage medium of claim 1 wherein the estimating of the first-photon triggered time stamp is based on the value $\sqrt{P1/Pm}$.

3. The non-transitory storage medium of claim 2 wherein the estimating of the first-photon triggered time stamp comprises computing:

$$TS_1 = TS_m - a\sqrt{\frac{P1}{Pm}}$$

where $TS_m$ is the timestamp of the imaging radiation detection event using multi-photon triggering, a is a constant, and $TS_1$ is the estimated first-photon triggered time stamp.

4. The non-transitory storage medium of claim 1 wherein the operation of determining an average photon count P1 for the radiation detector element operating with first photon triggering comprises:
    determining P1 by fitting a Gaussian distribution to a photon count per event histogram acquired by the radiation detector element using first-photon triggering.

5. The non-transitory storage medium of claim 1 wherein the imaging radiation detection event is an imaging 511 keV gamma ray detection event and the calibration data acquired by the radiation detector element using first-photon triggering are calibration data acquired by the radiation detector element for 511 keV gamma ray emissions using first-photon triggering.

* * * * *